United States Patent
Izumo et al.

(10) Patent No.: US 10,126,161 B2
(45) Date of Patent: Nov. 13, 2018

(54) OVERLOAD PREVENTION MECHANISM

(71) Applicant: A&D COMPANY, LIMITED, Tokyo (JP)

(72) Inventors: Naoto Izumo, Saitama (JP); Satoshi Suzaki, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/557,668

(22) PCT Filed: Mar. 26, 2015

(86) PCT No.: PCT/JP2015/059396
§ 371 (c)(1),
(2) Date: Sep. 12, 2017

(87) PCT Pub. No.: WO2016/151844
PCT Pub. Date: Sep. 29, 2016

(65) Prior Publication Data
US 2018/0058913 A1 Mar. 1, 2018

(51) Int. Cl.
*G01G 21/00* (2006.01)
*G01G 23/00* (2006.01)
(Continued)

(52) U.S. Cl.
CPC .......... *G01G 23/005* (2013.01); *G01G 21/22* (2013.01); *G01G 21/23* (2013.01); *G01G 23/02* (2013.01); *G01G 21/28* (2013.01)

(58) Field of Classification Search
CPC ...... G01G 23/005; G01G 21/22; G01G 21/23; G01G 23/02; G01G 21/28
(Continued)

(56) References Cited

U.S. PATENT DOCUMENTS

2003/0106723 A1* 6/2003 Thakur ............. G01G 19/4142
177/144
2005/0045388 A1* 3/2005 Burkhard ............. G01G 23/005
177/187
(Continued)

FOREIGN PATENT DOCUMENTS

JP 63-139528 U 9/1988
JP 04-106731 U 9/1992
(Continued)

OTHER PUBLICATIONS

International Search Report and Written Opinion dated May 19, 2015 in the corresponding application PCT/JP2015/059396.

*Primary Examiner* — Max Noori
(74) *Attorney, Agent, or Firm* — Roberts Mlotkowski; Safran Cole & Calderon, P.C.

(57) ABSTRACT

Provided is an overload prevention mechanism having a structure that protects a weight sensor with a floating action and ensuring the reproducibility of the return position of the weight sensor. The overload prevention mechanism has a resilient member that is interposed between the weight sensor and the case, supports the weight sensor in a pressing manner against the case, and when a certain plate load or greater is imposed causes the weight sensor to separate from the case and thereby be released from the load, a guide member that is arranged in a standing manner between the weight sensor and the case, and a guide receiving seat that is provided in the weight sensor or the case and engages with the guide member.

5 Claims, 4 Drawing Sheets

(51) Int. Cl.
   *G01G 21/23* (2006.01)
   *G01G 23/02* (2006.01)
   *G01G 21/22* (2006.01)
   *G01G 21/28* (2006.01)

(58) Field of Classification Search
   USPC .................................................. 73/862.382
   See application file for complete search history.

(56) References Cited

U.S. PATENT DOCUMENTS

2008/0006451 A1* 1/2008 Leahy .................... G01G 21/23
                                                    177/238
2009/0157256 A1* 6/2009 Hwang ............. B60R 21/01516
                                                    701/36

FOREIGN PATENT DOCUMENTS

| JP | 2005-227284 A | 8/2005 |
| JP | 2007-315773 A | 12/2007 |
| JP | 2013-011485 A | 1/2013 |

* cited by examiner

OVERLOAD PREVENTION MECHANISM

CROSS-REFERENCE TO RELATED APPLICATIONS

The present application is a U.S. National Phase of PCT/JP2015/059396 filed on Mar. 26, 2015. The disclosure of the PCT Application is hereby incorporated by reference into the present Application.

TECHNICAL FIELD

The present invention relates to an overload prevention mechanism to protect a weight sensor from overloads.

BACKGROUND ART

In recent years, while the resolution of balances has increased, their weighing capacities have reached several kilograms to several hundred kilograms, and their use conditions have become more severe for weight sensors required to have high sensitivity. In addition, there are many cases where users use balances without regard to their weighing capacities, and due to such a difference between requirements for balances and users' awareness, balances are often subjected to unexpected overloads in many cases.

On the other hand, in some balances, for the purpose of protection of a weight sensor from overloads, an overload prevention mechanism is added. For example, in Patent Literature 1, an overload prevention mechanism is added which is configured so that a spring member 24 to support a weight sensor 12 is interposed between a fixing frame 12b of the weight sensor and an upper case 14 of a balance, the weight sensor 12 is pressed against the upper case 14 in advance with a force of a weighing capacity+α of a resilient force of the spring member 24, and when a certain plate load (overload) or more is generated, the spring member 24 resiliently deforms and causes the weight sensor 12 to separate from the upper case 14 and float and thereby be released from the overload.

CITATION LIST

Patent Literature

Patent Literature 1: Japanese Unexamined Patent Application Publication No. 2007-315773

SUMMARY OF THE INVENTION

Problem to be Solved by the Invention

The overload prevention mechanism having the floating structure described above is an excellent mechanism capable of protecting a weight sensor from overloads in all directions of an up direction and lateral directions of the weighing plate. However, how to accurately return the weight sensor to its original initial position after it once floats large and is released from an overload is the overriding problem. When the weight sensor returns to a position different from the initial position or returns in a different state, a tilting error is caused by a tilt of the weighing plate, and a change in sensor distortion caused by a change in preliminary load of the spring member causes an increase in a four-corner error and occurrence of a return error, resulting in deterioration in basic performance as a weighing scale.

An object of the present invention is to provide an overload prevention mechanism having a structure to protect a weight sensor with a floating action and ensuring reproducibility of a return position of the weight sensor.

Means for Solving the Problem

In order to solve the above-described problem, an overload prevention mechanism according to the present invention includes a resilient member that is interposed between a weight sensor and a case in which the weight sensor is incorporated, supports the weight sensor in a pressing manner against the case, and when a certain plate load or more is applied, causes the weight sensor to separate from the case and thereby be released from the load, a guide member arranged in a standing manner between the weight sensor and the case, and a guide receiving seat that is provided in the weight sensor or the case and engages with the guide member.

In the embodiment described above, it is also preferable that the guide member has a guide part, and the guide part includes a planar part at a top portion and a vertical part below the planar part.

In the embodiment described above, it is also preferable that the guide part includes a tapered part spread toward the bottom between the planar part and the vertical part.

In the embodiment described above, is also preferable that the guide receiving seat has a concave space to which the guide part is guided, and the concave space includes a bottom surface part that comes into contact with the planar part, an inclined part on which the tapered part slides, and a substantially vertical part that comes into contact with the vertical part.

In the embodiment described above, it is also preferable that the guide member includes the guide part, a joint part to be joined to the weight sensor or the case, and a relay part that connects the guide part and the joint part.

In the embodiment described above, is also preferable that width across flat portions are formed on the relay part.

In the embodiment described above, it is also preferable that at least one of the guide member and the guide receiving seat is made of a material with heat insulating properties.

In the embodiment described above, it is also preferable that the guide member is arranged in a standing manner from the weight sensor, and the guide receiving seat is provided in the case.

Effect of the Invention

The overload prevention mechanism according to the present invention can ensure reproducibility of a return position of a weight sensor while protecting the weight sensor from overloads in all directions with a floating action.

BEST MODES FOR CARRYING OUT THE INVENTION

Next, preferred embodiments of the present invention are described based on the drawings.

First Embodiment (Overall Configuration)

Figure 1:
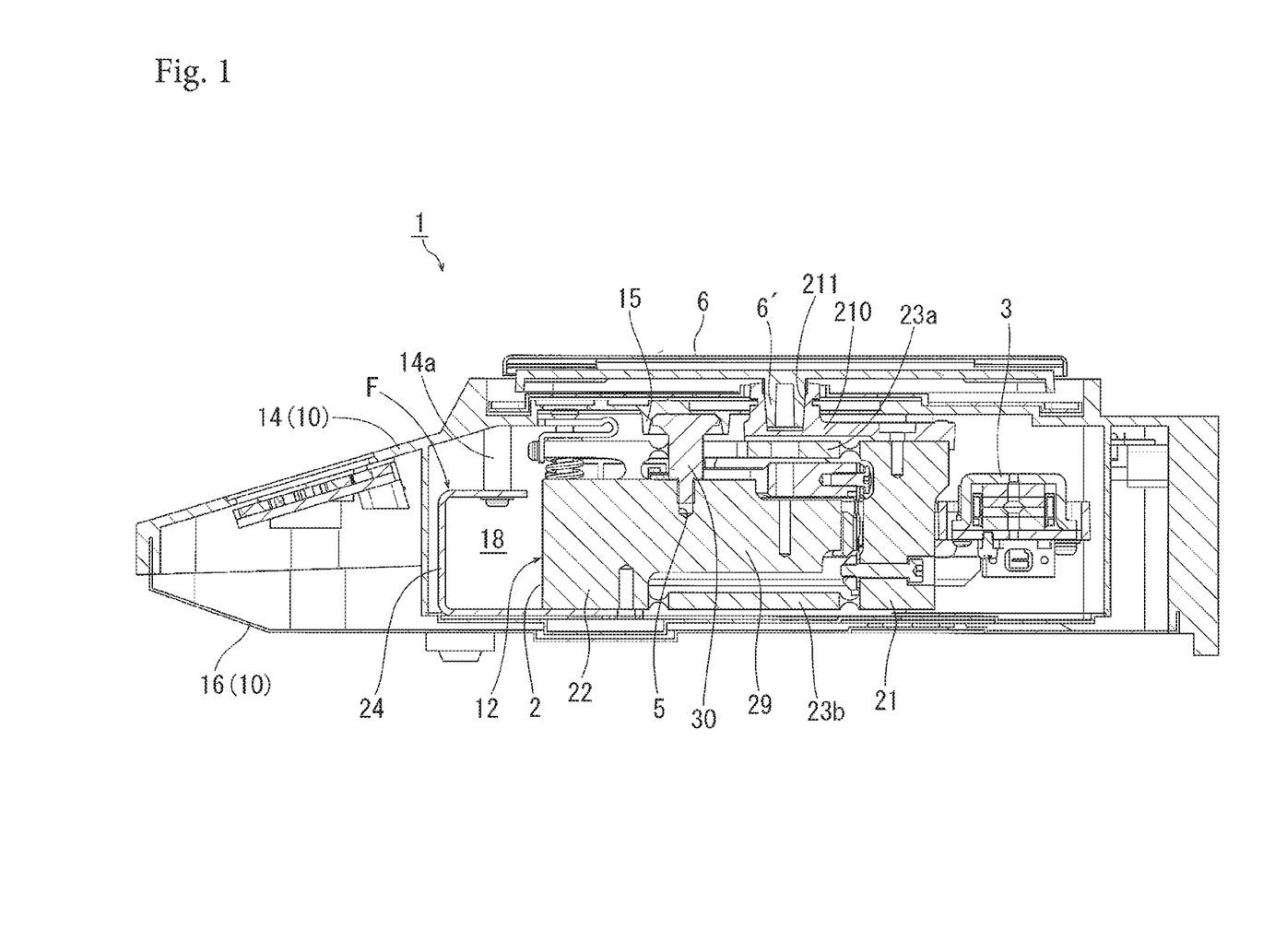
FIG. 1 is a sectional view of a balance for describing an overload prevention mechanism according to a first embodiment.
Figure 2:
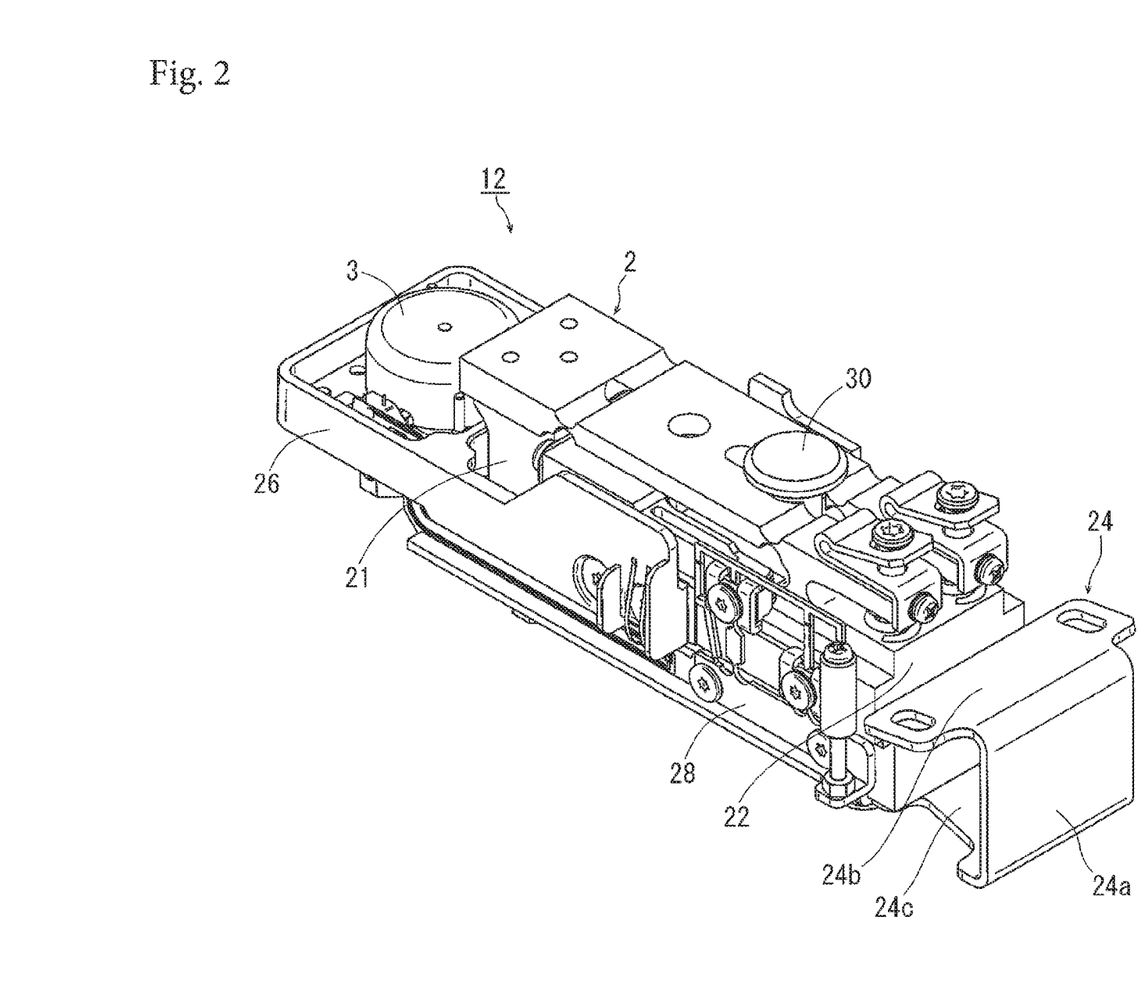
FIG. 2 is a top perspective view of a weight sensor for describing the same overload prevention mechanism.

FIG. 1 is a sectional view of a balance 1 for describing an overload prevention mechanism according to a first embodiment, and FIG. 2 is a top perspective view of a weight sensor 12 for describing the overload prevention mechanism.

The example shown in the drawings shows a case where the present invention is applied to an electronic balance 1 of an electromagnetic force type, and the electronic balance 1 includes a weight sensor 12, and a case 10 that accommodates the weight sensor 12. The present invention is applied not only to such a weight sensor 12 of an electromagnetic force type, but also to a weight sensor of a strain gauge type, etc.

The case 10 is formed by aluminum die-casting or formed of a synthetic resin such as ABS resin containing carbon fiber, and includes an upper case 14 and a lower case 16 whose circumferential edges are fitted to each other. Inside the case 10, a space 18 is demarcated, and the weight sensor 12 is installed inside this space 18.

The weight sensor 12 has a substantially rectangular parallelepiped shape, and includes a Roberval mechanism 2 and a sensor main body 3 of an electromagnetic force type sensor.

The Roberval mechanism 2 includes a columnar floating frame 21 that receives a load of a weighing object, a fixing frame 22 that is fixed to the case 10, and an upper sub-frame 23a and a lower sub-frame 23b that have tabular shapes and are disposed one above the other in parallel to each other between the floating frame 21 and the fixing frame 22. The floating frame 21 and the fixing frame 22 are disposed to face each other and joined by the upper sub-frame 23a and the lower sub-frame 23b. These floating frame 21, fixing frame 22, upper sub-frame 23a and lower sub-frame 23b are formed by cutting with a milling machine from one metal block molded by aluminum die-casting, aluminum extrusion, aluminum forging, or the like.

In the fixing frame 22, a load transmitting part 29 projecting to a structure internal space of the Roberval mechanism 2 is formed. The load transmitting part 29 is joined to the floating frame 21 via a suspension band, a primary beam body, and a fulcrum band. A load applied to the floating frame 21 is transmitted to the sensor main body 3 via a secondary beam body 28 screwed to aside surface of the load transmitting part 29. The sensor main body 3 is held by the Roberval mechanism 2 via a frame body 26.

Onto an upper surface of the floating frame 21, a plate receiving part 210 to support a weighing plate 6 is screw-fixed (description of the plate receiving part 210 is omitted in FIG. 2). The plate receiving part 210 has a plate hole 211 to engage with a plate boss 6' formed at a center position of the weighing plate 6, and the plate hole 211 is formed to be positioned above the load transmitting part 29. In the load transmitting part 29, a guide member receiving hole 5 into which a guide member 30 described below is attached is provided near the plate hole 211 (refer to FIG. 1).

A support structure of the weight sensor 12 is configured as follows in the present embodiment. The weight sensor 12 is supported to float so that a lower end surface of the weight sensor 12 is separated upward by a predetermined distance from an upper surface of the lower case 16 by a spring member 24 (resilient member) interposed between the fixing frame 22 and a lower surface of the upper case 14.

The spring member 24 is a plate spring that includes a main body part 24a and a pair of first and second movable pieces 24b and 24c facing both ends of the main body part 24a, and has U-shaped side surfaces, and is formed by folding a plate-shaped metal plate with a predetermined width so that both end sides thereof face each other at approximately 90°. With the spring member 24, one first movable piece 24b on the upper side is screw-fixed to a spring fixing part 14a suspended integrally from a lower surface of the upper case 14, and the other second movable piece 24c on the lower side is screw-fixed to a lower surface of the fixing frame 22 of the weight sensor 12.

Figure 3:
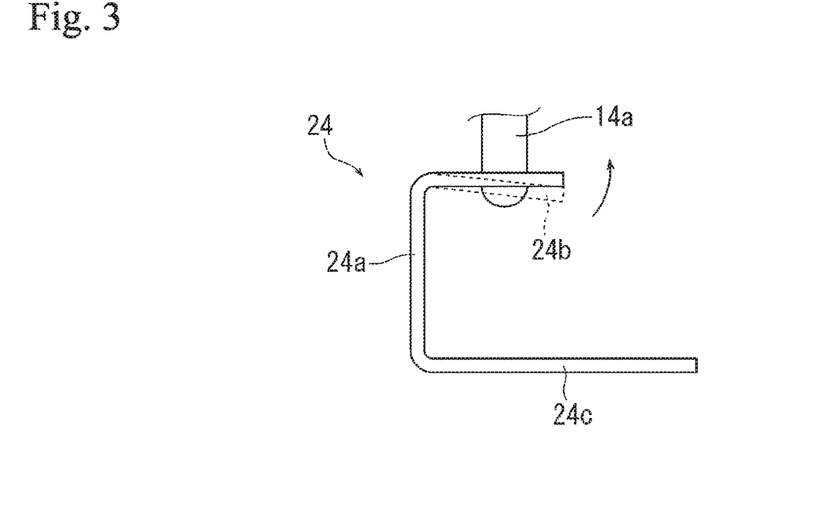
FIG. 3 is an explanatory view of attachment of the weight sensor via a spring member.
Figure 4A:
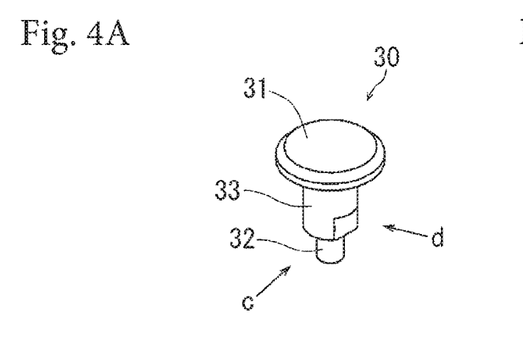
FIG. 4(a) is a perspective view of a guide member for describing the same overload perspective view.
Figure 4B:
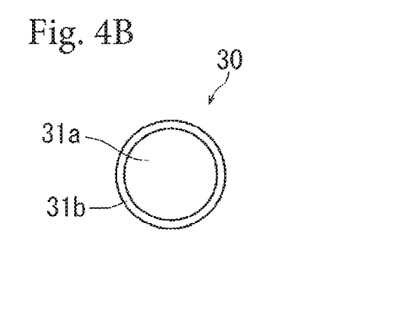
FIG. 4(b) is a plan view of the guide member.
Figure 4C:
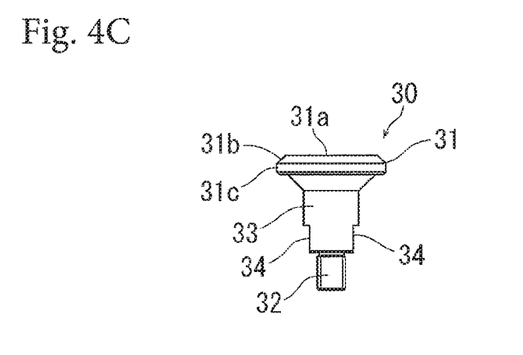
FIG. 4(c) is a view from the arrow c direction of the guide member.
Figure 4D:
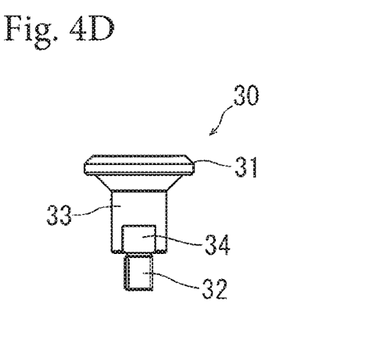
FIG. 4(d) is a view from the arrow d direction of the guide member.

FIG. 3 is an explanatory view of attachment of the weight sensor 12 via the spring member 24, and is an enlargement of the sectional view of the spring member 24 shown in FIG. 1. In order to support the weight sensor 12 by the spring member 24, as shown by the dotted line in FIG. 3, one movable piece 24b is resiliently deformed by being folded to become proximal to the other movable piece 24c side in advance, and when supporting the weight sensor 12, the weight sensor 12 is attached so that an offset load is applied thereon. That is, as shown by the dotted line in FIG. 3, the first movable piece 24b is folded so as to become proximal to the second movable piece 24c side in advance, and when the first movable piece 24b is screw-fixed to a flat surface of the spring fixing part 14a, the second movable piece 24c reaches a state where it is moved to the upper side corresponding to the amount of folding in advance. A pressing biasing force (preliminary load) at this time can be adjusted by the offset load of the spring member 24, and this offset load can be set to a load obtained by adding a predetermined safety factor $\alpha$ to a maximum value that the balance can weigh. The shape of the spring member 24 for generation of the preliminary load is not limited to this, and the second movable piece 24c may be folded, or a plate spring formed into a substantially crank shape may be interposed between the lower case 16 and the lower surface of the sensor fixing frame 22. When the second movable piece 24c moves upward, in association with this, the weight sensor 12 moves upward.

(Guide Member)

FIG. 4 are drawings showing a guide member 30 for describing the overload prevention mechanism. Among FIG. 4, FIG. 4(a) is a perspective view, FIG. 4(b) is a plan view, FIG. 4(c) is a view from the arrow c direction in FIG. 4(a), and FIG. 4(d) is a view from the arrow d direction in FIG. 4(a).

From the weight sensor 12, the guide member 30 is arranged in a standing manner between the weight sensor 12 and the upper case 14. The guide member 30 includes a guide part 31, a joint part 32, and a relay part 33. The guide member 30 is columnar as a whole, and the guide part 31 is formed into a true circle.

The guide part 31 includes a horizontal planar part 31a at the top portion, a tapered part 31b formed of an inclined surface that spreads toward the bottom and is rounded or chamfered to be nonangular on the entire lower circumference of the planar part 31a, and a vertical part 31c formed of a vertical surface that is vertical to the planar part 31 on the entire lower circumference of the tapered part 31b.

The joint part 32 is a portion to attach the guide member 30 to the weight sensor 12, and is formed into a screw shape, and can be inserted into the guide member receiving hole 5 formed in the load transmitting part 29 of the weight sensor 12. The attachment of the guide member 30 to the weight sensor 12 can also be realized by press-fitting, joining, or adhesive bonding.

The relay part 33 is a portion connecting the guide part 31 and the joint part 32, and in a lower region of a side surface of the relay part, width across flat portions 34 are formed. Accordingly, a jig such as a spanner can be inserted into the space between the upper sub-frame 23a and the load transmitting part 29 and turned by using the width across flat portions 34 of the relay part 33 as clamping positions, so that the guide member can be easily attached to the guide member receiving hole 5, and therefore, the relay part preferably functions when attaching the guide member 30 to the weight sensor 12.

(Guide Receiving Seat)

Figure 5:
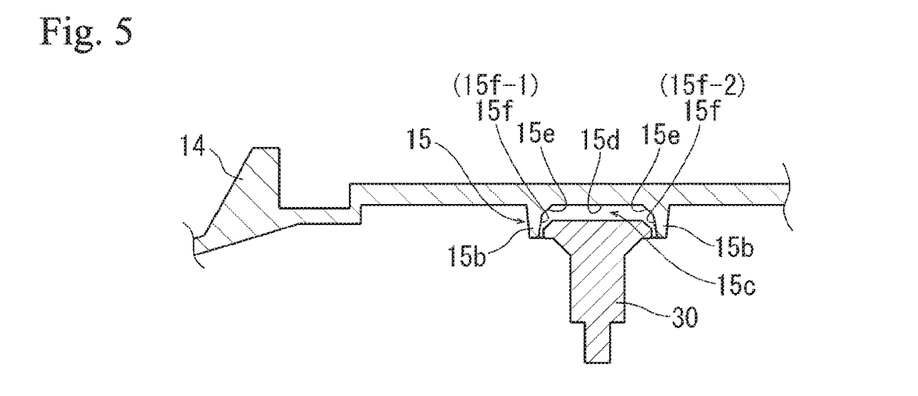
FIG. 5 is a view showing a guide receiving seat.

On the lower surface of the upper case 14, at an upper side of an attaching position of the guide member 30, a guide receiving seat 15 is formed. FIG. 5 is a view showing the guide receiving seat 15, and is an essential portion enlarged view of FIG. 1.

The guide receiving seat 15 is defined by a suspended wall 15b extending from the lower surface of the upper case 14. The suspended wall 15b defines a bottomed concave space 15c that can enclose the entire circumference of the guide part 31 of the guide member 30. The guide receiving seat 15 guides the guide part 31 to the concave space 15c. FIG. 5 shows a state where the guide member 30 floats in the concave space 15c.

Although the concave space 15c is formed into a substantially inverted shape of the shape of the guide part 31 of the guide member 30, the bottom surface part 15d as a ceiling of the concave space 15c is formed of a horizontal plane, and on the entire lower circumference of the bottom surface part 15d, an inclined part 15e having an inclined surface substantially matching the tapered part 31b of the guide member 30 is formed, and on the entire lower circumference of the inclined part 15e, a substantially vertical part 15f formed to slightly spread to the bottom relative to the vertical direction so as to define a truncated cone-shaped space is formed.

(Operation and Effects)

Next, operation and effects of the overload prevention mechanism according to the present embodiment configured as described above are described.

Under normal conditions, the weight sensor 12 is held by a fixed preliminary load generated by the spring member 24, and the guide member 30 standing upward from the weight sensor 12 is pressed against the guide receiving seat 15 of the upper case 14. Here, when a force (overload) greater than the preliminary load is applied from above the weighing plate 6 or a lateral direction of the weighing plate 6, the force overwhelms the biasing force of the spring member 24 and the weight sensor 12 separates downward from the upper case 14 and floats in the space 18, and the weight sensor 12 is released from the overload. By this floating action, the weight sensor 12 can be protected from overloads in all directions. At this time, the guide part 31 of the guide member 30 also floats in the concave space 15c of the guide receiving seat 15.

When the weight sensor 12 separates from the upper case 12, as a result, the overload is applied to the spring member 24, and the spring member 24 resiliently deforms and absorbs the overload. Then, when the overload is removed, due to a restoring force of the spring member 24, the weight sensor 12 moves upward. At this time, in the guide member 30 that floated in the concave space 15c of the guide receiving seat 15, the tapered part 31b and/or the vertical part 31c of the guide part 31 is guided upward by the substantially vertical part 15f of the guide receiving seat 15. As a result, since the planar part 31a of the guide part 31 and the bottom surface part 15d of the guide receiving seat 15 come into horizontal contact with each other in an instant, a position of the weight sensor 12 in the vertical direction (height direction) is determined, and since the outer circumference of the vertical part 31c of the guide part 31 comes into contact with the entire inner circumference of the substantially vertical part 15f of the guide receiving seat 15, a position of the weight sensor 12 in the horizontal direction is determined. Therefore, even when the weight sensor 12 is made to float, the weight sensor 12 can be reliably and accurately returned to the initial position.

Here, in order to determine the position of the weight sensor 12 in the horizontal direction, the substantially vertical part 15f of the guide receiving seat 15 should be formed of a vertical surface. On the other hand, in the present embodiment, when an overload is applied, the guide member 30 needs to be released downward. The overload is not limited to the vertical direction, but includes all directions such as diagonal directions, and in an extreme case, the horizontal direction. Therefore, the substantially vertical part 15f of the guide receiving seat 15 should have an inclined surface spread from the axial center of the guide member 30 to the outer circumference side.

Thus, since positioning in the horizontal direction and releasing at the time of overloading involve contradictory requirements, in order to make both of them function properly, the substantially vertical part 15f preferably defines a truncated conical space, and an inclination angle thereof is preferably 45° or more and 90° or less from the horizontal direction. More preferably, from the viewpoint that position determination in the horizontal direction can be realized by line contact between an upper portion of the vertical part 31c and an upper portion of the substantially vertical part 15f in the entire circumferential direction, it is preferable to secure a space below the substantially vertical part 15f to preferably release the guide part 31 from an overload having a horizontal component, and the angle of the substantially vertical part 15f is preferably 45° or more and 80° or less from the horizontal direction.

Further, the inclination of the substantially vertical part 15f is preferably set as follows in consideration of a positional relationship with the spring member 24. In the case of the positional relationship shown in FIG. 1, when an overload is applied to the weighing plate 6, the weight sensor 12 makes rotational movement around a corner (the sign F in FIG. 1) near the attaching portion between the spring member 24 and the case 14, and the sign 15f-1 side (spring member 24 side) in FIG. 5 of the substantially vertical part 15f serves as a positioning portion for the guide part 31 (vertical surface 31c), so that the inclination angle thereof is preferably 60° or more and 90° or less from the horizontal direction, and is particularly preferably close to 90° from the horizontal direction. On the other hand, an inclination angle of the sign 15f-2 side (the opposite side of the spring member 24) of the substantially vertical part 15f is preferably 45° or more and 80° or less from the horizontal direction so as not to be gnawed by the guide part 31 (tapered surface 31b, vertical surface 31c), and particularly preferably an angle close to a tangential direction with respect to the rotational movement of the spring member 24. However, it can be changed according to the shapes of the tapered surface 31b and the vertical surface 31c.

For preferable releasing at the time of overloading described above, the guide part 31 includes the tapered part 31b. The tapered part 31b is provided to make the guide part 31 slide out from the guide receiving seat 15 at the time of overloading, and is necessary to prevent the vertical part 31c from interfering with the substantially vertical part 15f of the guide receiving seat 15. The angle of the tapered part 31g is preferably 30° to 60° from the horizontal direction, and more preferably, from the viewpoint of preferable sensing of overloads from all directions, 45° from the horizontal direction.

The guide member 30 of the present embodiment is arranged in a standing manner near a center position of the weighing plate 6 (a position of a plate boss 6'). That is, a sensor positioning mechanism constituted by the guide member 30 and the guide receiving seat 15 is formed on a line connecting the weight sensor fixing part of the spring member 24 and the plate center, so that it can be reduce the positional displacement of the return position of the weighing plate 6.

(Material)

Here, preferred embodiments of materials of the guide member 30 and the guide receiving seat 15 in the present invention are described. In the present invention, when the overload prevention mechanism is in an operating state, it is assumed that the guide member 30 and the guide receiving seat 15 serve as contact portions of the weight sensor 12 and the upper case 14, and the guide member 30 and the guide receiving seat 15 are repeatedly subjected to overloads. When the overload prevention mechanism is in a non-operating state, the weight sensor 12 is in contact with the upper case 14 via the guide member 30 and the guide receiving seat 15, so that a temperature change around the case 10 may be transmitted to the weight sensor 12 via the guide member 30 and the guide receiving seat 15.

As a premise, for the weight sensor 12, an aluminum material is generally used from the viewpoint of the balance among lightness, rigidity, and machinability. It is known that aluminum has a high heat conductivity (low heat insulating properties), and has properties that easily cause welding and wearing although it is a metal material. Therefore, at least one of the guide member 30 and the guide receiving seat 15 is preferably made of a material that is difficult to weld to the weight sensor 12 and has high heat insulating properties. For the guide member 30 and the guide receiving seat 15, a combination of materials that reduce friction and wearing between them and is difficult to weld to each other is preferably used, and the guide member and the guide receiving seat are made of, for example, stainless steel and aluminum, aluminum and zinc, or reinforced plastic and a metal, etc.

In the present embodiment, it is preferable that a guide receiving seat 15 made of aluminum is insert-molded or attached and fixed to the upper case 14 made of a synthetic resin, and the guide member 30 is formed of an integral structure made of stainless steel and attached to the weight sensor 12. Besides this, it is also preferable that the guide receiving seat 15 is integrally molded with the upper case 14 made of aluminum, and the guide member 30 is made of stainless steel or a resin containing carbon fiber.

Accordingly, in the present embodiment, when the overload prevention mechanism is in an operating state, among the guide receiving seat 15, the guide member 30 and the weight sensor 12 arranged in order from the load receiving direction, an impact is absorbed by the guide receiving seat 15, and breakage of the weight sensor 12 can be avoided. In addition, since the guide receiving seat 15 (upper case 14) and the weight sensor 12 are insulated by the guide member 30 made of stainless steel, occurrence of a temperature error of the weight sensor 12 can be prevented.

Second Embodiment

Figure 6:
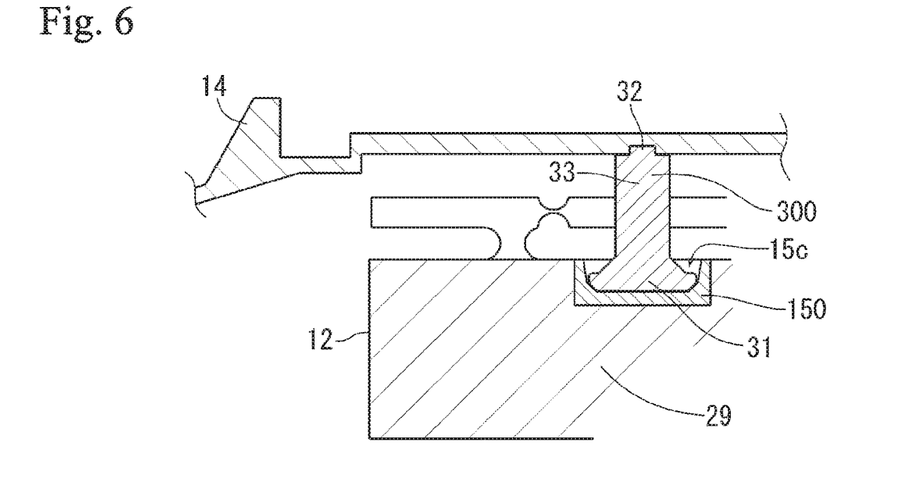
FIG. 6 is a schematic sectional view of a balance for describing an overload prevention mechanism according to a second embodiment.

FIG. 6 is a schematic sectional view of a balance for describing an overload prevention mechanism according to a second embodiment. This embodiment is different from the first embodiment in that the guide receiving seat is provided on the weight sensor 12 side, and the guide member is arranged in a standing manner from the case 14 side. The same components as in the first embodiment are designated by the same reference signs, and overlapping description is omitted.

In this embodiment, a guide member 300 including a guide part 31, a joint part 32, and a relay part 33, like the guide member 30, is disposed upside down relative to the embodiment described above, and stands downward from the upper case 14. In addition, a guide receiving seat 150 including a concave space 15c, like the guide receiving seat 15, is formed in the load transmitting part 29 of the weight sensor 12.

Thus, the guide receiving seat 150 may be disposed on the weight sensor 12 side. In this embodiment as well, the guide member 300 is guided by the guide receiving seat 150, and positions of the weight sensor 12 in the vertical direction and the horizontal direction are determined. Therefore, although the weight sensor 12 floats, it can be reliably and accurately returned to an initial position.

In this embodiment as well, as in the case of the embodiment described above, a combination of different kinds of materials is preferably used to make the guide member 300 and the guide receiving seat 150.

In the present embodiment, the guide member 300 may be integrally molded with the upper case 14 from the same resin, however, preferably, the guide member is made as a separate body of a resin or metal having hardness satisfying the hardness ranking: hardness of the guide receiving seat 150<hardness of the weight sensor 12, and attached to the upper case 14. On the other hand, the guide receiving seat 150 may be made of the same material as the weight sensor 12, however, preferably, it is made as a separate body from the weight sensor 12, and more preferably, made of stainless steel having high strength, heat insulating properties, and wear resistance. Accordingly, even if an impact is applied to the guide member 300, the guide member 300 can be structured to be resistant to wear. In addition, by the heat insulation by the guide receiving seat 150, a temperature error of the weight sensor 12 can be prevented from being caused by an ambient temperature change from the plate with a large surface area. The guide member 300 can also be formed to have heat insulating properties.

Figure 7A:
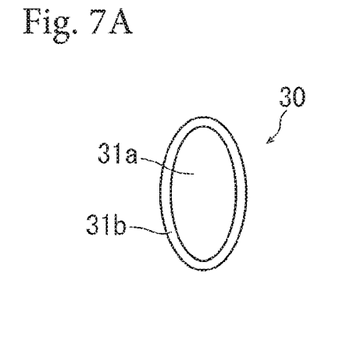
FIGS. 7(a) and 7(b) are views showing modifications of the guide member.
Figure 7B:
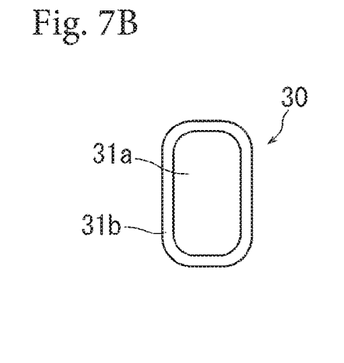

FIG. 7 are views showing modifications of the guide member 30 (300), and particularly show examples of variation of the shape of the guide part 31. As shown in FIG. 7(a), the shape of the guide part 31 may be a circle such as an oval. Alternatively, as shown in FIG. 7(b), the shape of the guide part 31 may be a polygon such as a quadrangle whose corners are rounded. However, the present invention is a mechanism that protects the weight sensor 12 from overloads in all directions, so that in these modifications as well, the tapered part 31b and the vertical part 31c need to be formed in the entire circumferential direction, like those shown in FIG. 4.

Instead of a mode in which the guide receiving seat 15 is directly provided on the upper case 14 in the first embodiment, a mode in which inside the outer case 10, another internal case and a fixing member, etc., are provided, and the guide receiving seat 15 is formed thereon, is also included in the scope of the present invention. The same applies to the mode in which the guide member 300 is formed in the second embodiment.

Preferred embodiments and modifications of the overload prevention mechanism of the present invention are described above, and these are examples of the present invention, and each embodiment and each modification can be combined

REFERENCE SIGNS LIST

12 Weight sensor
14 Upper case
15 Guide receiving seat
16 Lower case
24 Spring member (resilient member)
30 Guide member
31 Guide part
31a Guide part planar surface
31b Guide part tapered surface
31c Guide part vertical surface
32 Joint part
33 Relay part
34 Width across flat portions

The invention claimed is:

1. An overload prevention mechanism comprising:
a resilient member that is interposed between a weight sensor and a case in which the weight sensor is incorporated, supports the weight sensor in a pressing manner against the case, and when a certain plate load or more is applied, causes the weight sensor to separate from the case and thereby be released from the load;
a guide member arranged in a standing manner between the weight sensor and the case; and
a guide receiving seat that is provided in the weight sensor or the case and engages with the guide member, wherein
the guide member has a guide part, and the guide part includes a planar part at a top portion, a vertical part below the planar part, and a tapered part spread toward the bottom between the planar part and the vertical part, and
the guide receiving seat has a concave space to which the guide part is guided, and the concave space includes a bottom surface part that comes into contact with the planar part, an inclined part on which the tapered part slides, and a substantially vertical part that comes into contact with the vertical part and formed to slightly spread toward the bottom relative to the vertical direction.

2. The overload prevention mechanism according to claim 1, wherein the guide member includes the guide part, a joint part to be joined to the weight sensor or the case, and a relay part that connects the guide part and the joint part.

3. The overload prevention mechanism according to claim 2, wherein width across flat portions are formed on the relay part.

4. The overload prevention mechanism according to claim 1, wherein at least one of the guide member and the guide receiving seat is made of a material with heat insulating properties.

5. The overload prevention mechanism according to claim 1, wherein the guide member is arranged in a standing manner from the weight sensor, and the guide receiving seat is provided in the case.

* * * * *